(12) United States Patent
Chowdhury et al.

(10) Patent No.: US 6,856,450 B2
(45) Date of Patent: Feb. 15, 2005

(54) METHOD AND APPARATUS FOR GENERATING A SEQUENCE OF OPTICAL WAVELENGTH BANDS

(75) Inventors: Aref Chowdhury, Springfield, NJ (US); Robert Meachem Jopson, Rumson, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 233 days.

(21) Appl. No.: 10/122,804

(22) Filed: Apr. 15, 2002

(65) Prior Publication Data

US 2003/0193710 A1 Oct. 16, 2003

(51) Int. Cl.[7] .............................. G02F 1/35; G02F 2/02
(52) U.S. Cl. ..................................................... 359/326
(58) Field of Search ................................ 359/326–332; 385/122; 372/21, 22

(56) References Cited

U.S. PATENT DOCUMENTS

| | | | | |
|---|---|---|---|---|
| 3,619,637 A | * | 11/1971 | Goto ........................... | 359/328 |
| 3,644,845 A | * | 2/1972 | Harris ......................... | 359/330 |
| 3,962,576 A | * | 6/1976 | Kuhl et al. .................. | 359/326 |
| 4,272,694 A | * | 6/1981 | Jacobs ......................... | 359/329 |
| 4,346,314 A | * | 8/1982 | Craxton ....................... | 359/329 |
| 4,633,103 A | * | 12/1986 | Hyman et al. .............. | 359/327 |
| 4,884,277 A | * | 11/1989 | Anthon et al. .............. | 372/22 |
| 5,033,051 A | * | 7/1991 | Werner ........................ | 359/327 |
| 5,047,668 A | * | 9/1991 | Bosenberg ................... | 359/330 |
| 5,101,291 A | | 3/1992 | Jopson ........................ | 359/124 |
| 5,117,126 A | * | 5/1992 | Geiger ......................... | 359/330 |
| 5,734,493 A | | 3/1998 | Jopson ........................ | 350/326 |
| 5,825,517 A | * | 10/1998 | Antoniades et al. ......... | 398/50 |
| 5,946,129 A | | 8/1999 | Xu et al. ...................... | 350/332 |
| 6,456,424 B1 | * | 9/2002 | Arbore et al. ............... | 359/330 |
| 2001/0036208 A1 | * | 11/2001 | Zhou et al. .................. | 372/21 |
| 2002/0141457 A1 | * | 10/2002 | Adams .......................... | 372/10 |

OTHER PUBLICATIONS

Osamu Tadanaga, et al., "A 1–THz Optical Frequency Shifter Using Quasi–Phase–Matched LiNb 03 Wavelength Converters, " Digest OFC 2002, pp. 592–593, 2002.

* cited by examiner

*Primary Examiner*—John D. Lee
(74) *Attorney, Agent, or Firm*—M. I. Finston (57) ABSTRACT

An optical comb generator includes frequency-shifting elements of a particular type that we refer to as a "frequency mirror." A frequency mirror mixes input light at a signal frequency and a reference frequency to produce output light at a third frequency that lies in contraposition to the signal frequency relative to the reference frequency. The comb generator includes at least two frequency mirrors, having respective reference frequencies $F_1$ and $F_2$. At least some of the power of a light beam is shifted by the first frequency mirror from an input frequency to a frequency that lies in contraposition thereto relative to $F_1$, and then light at the shifted frequency is shifted to yet a new frequency by the second frequency mirror. The resulting twice-shifted frequency lies in contraposition to the once-shifted frequency, relative to $F_2$. The result is that a difference of $2(F_2-F_1)$ separates the twice-shifted frequency from the input frequency. This process is repeatable to generate a comb of equally spaced, shifted frequencies. In specific embodiments of the invention, the frequency mirror is a periodically poled lithium niobate (PPLN) device pumped by laser radiation at the pertinent reference frequency.

23 Claims, 5 Drawing Sheets

METHOD AND APPARATUS FOR GENERATING A SEQUENCE OF OPTICAL WAVELENGTH BANDS

FIELD OF THE INVENTION

This invention relates to applications of nonlinear effects to generate frequency-shifted optical signals. More particularly, the invention relates to optical comb generation.

ART BACKGROUND

In a wavelength-division multiplexed (WDM) optical network, independent signals are modulated onto optical carriers in distinct wavelength channels, and concurrently injected in a common optical fiber. Typical wavelength channels of current interest are spaced apart by 25, 50, 75, or 100 GHz. In most current WDM networks, the optical carrier in each band is generated by a separate laser. Since there are typically several tens of wavelength channels, the optical sources for carrier generation contribute substantially to the overall cost of the network. Those skilled in the art have recognized the advantages of a multiple-wavelength optical source that does not require a separate laser for each wavelength channel.

It is known that a laser beam at essentially a single wavelength can be arranged to interact with a frequency-shifting optical element of an appropriate kind to generate a beam containing a sequence, or "comb," of distinct wavelengths. Such an arrangement is described, for example, in U.S. Pat. No. 5,101,291, which issued on Mar. 31, 1992 to R. M. Jopson (the '291 patent).

The frequency-shifting element of the '291 patent is a Bragg cell. A Bragg cell is an optically polished crystal in contact with an electroacoustic transducer arranged to inject an ultrasonic wave into the crystal. A laser beam passing through the crystal interacts with the ultrasonic wave. In specific directions, the laser beam scatters from the crystal with an optical frequency shift of plus or minus the acoustic frequency of the ultrasonic wave.

In the arrangement of the '291 patent, the Bragg cell is included in an optical ring which also includes an optical amplifier. Light injected into the ring at the laser frequency undergoes a successive frequency shift on each pass through the Bragg cell, followed by amplification to compensate for optical losses in the ring. Each shift adds a further wavelength to the sequence of wavelengths that make up the resulting comb. A bandpass filter included in the ring limits the total number of wavelengths in the comb, so that the available optical power will not be depleted by spreading it over too many wavelengths.

Although useful, the comb generator of the '291 patent has limited application to WDM networks. The reason for this is that it is not generally feasible to generate ultrasonic waves of appropriate properties at frequencies substantially greater than 1 GHz. Consequently, it is not generally feasible to achieve the desired spacings between optical wavelength channels for WDM networks.

Frequency-shifting technologies other than the specific Bragg-cell-based technology of the '291 patent have been described in U.S. Pat. No. 5,734,493, which issued to R. M. Jopson on Mar. 31, 1998, and is commonly assigned herewith. Technologies described there include the bulk magneto-optic Bragg cell, waveguide magneto-optic scattering, waveguide acousto-optic scattering, and single-sideband modulation. Of these technologies, only single-sideband modulation has achieved optical frequency shifts of 20 GHz or more. However, difficulties with suppression of unwanted optical frequencies may limit applications of this technology in WDM systems.

Thus, there remains a need for an optical comb generator capable of achieving channel spacings appropriate for WDM networks.

SUMMARY OF THE INVENTION

We have invented a new optical comb generator, which readily achieves optical channel spacings of 25–100 GHz, or even more. Our comb generator includes frequency-shifting elements of a particular type that we refer to as a "frequency mirror." A frequency mirror mixes input light at a signal frequency and a reference frequency to produce output light at a third frequency that lies in contraposition to the signal frequency relative to the reference frequency. In other words, if the signal frequency is less by $\Delta f$ than the reference frequency, then the output frequency will exceed the reference frequency by $\Delta f$, and vice versa.

In our new comb generator, there are at least two frequency mirrors, having respective reference frequencies $F_1$ and $F_2$. At least some of the power of a light beam is shifted by the first frequency mirror from an input frequency to a frequency that lies in contraposition thereto relative to $F_1$, and then light at the shifted frequency is shifted to yet a new frequency by the second frequency mirror. The resulting twice-shifted frequency lies in contraposition to the once-shifted frequency, relative to $F_2$. The result is that a difference of $2(F_2-F_1)$ separates the twice-shifted frequency from the input frequency. This process is repeatable to generate a comb of equally spaced, shifted frequencies.

In specific embodiments of the invention, the frequency mirror is a periodically poled lithium niobate (PPLN) device pumped by laser radiation at the pertinent reference frequency.

DETAILED DESCRIPTION

As noted above, a frequency mirror is an optical element that has a reference optical frequency F. When a beam of light of frequency $f_s$ passes through a frequency mirror, at least some of the light in the output beam will have such a frequency $f_{out}$ in contraposition to F; that is, F will be at the midpoint between $f_s$ and $f_{out}$. Equivalently, $f_{out}=2F-f_s$.

Figure 1:
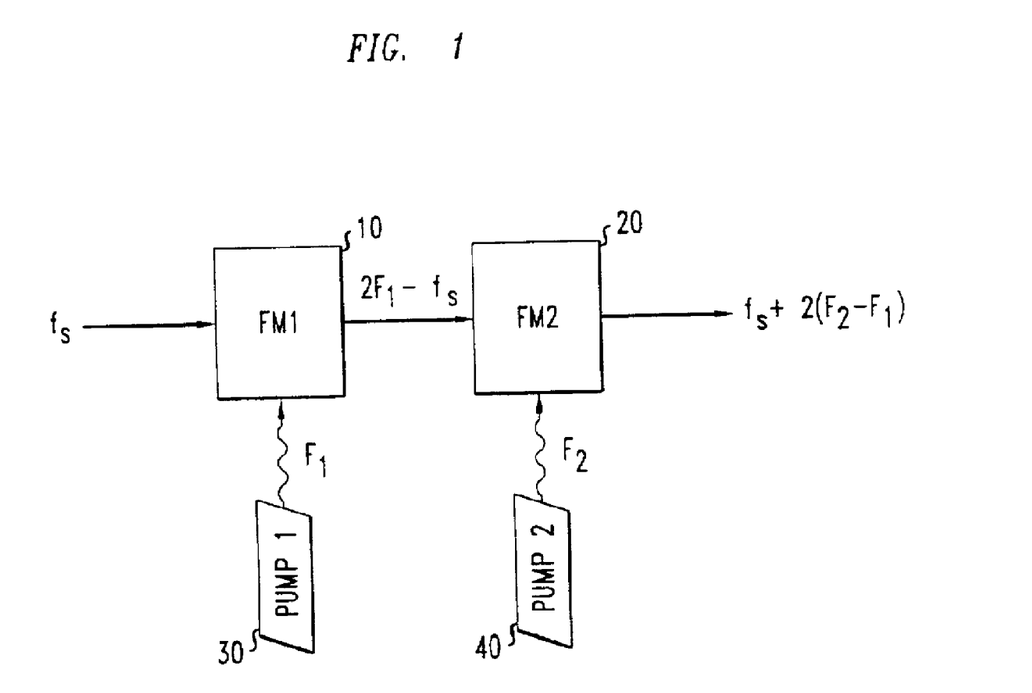
FIG. 1 is a simplified schematic drawing of an optical system in which an incident light beam is passed through two frequency mirrors in succession.

FIG. 1 illustrates the result of passing an incident light beam through two frequency mirrors in succession. Frequency mirror 10, denominated "FM1" in the figure, has a reference frequency $F_1$, and frequency mirror 20, denominated "FM2" in the figure, has a reference frequency $F_2$. As indicated in the figure, the output light that has been shifted in frequency by both frequency mirrors has the frequency $f_s+2(F_2-F_1)$. That is, the output frequency has been shifted by twice the difference between the two reference frequencies. As will be explained in more detail below, the frequency-shifted output can be repeatedly cycled back through frequency mirrors 10 and 20 to generate a frequency "comb;" i.e., a uniformly spaced sequence of shifted output frequencies. In the comb, the spacing between successive frequencies is $2(F_2-F_1)$, i.e., twice the spacing between the pump frequencies.

Several types of optical materials are known to exhibit the nonlinear optical behavior characteristic of frequency mirrors. A currently preferred material is periodically poled lithium niobate (PPLN). The electrical polarization within such material has a laminar structure, with regions of similar electrical polarization occupying planes oriented orthogonally to the input light beam. The repeat distance A of the periodic polarization is related to the reference frequency and its second harmonic (which has twice the reference frequency) and to the respective refractive indices $n_{ref}$ and $n_{2ref}$ of the PPLN for light of those frequencies, according to:

$$\Lambda = \frac{2\pi}{\Delta\beta} = \frac{2\pi}{\beta_{2ref}-2\beta_{ref}} = \frac{2\pi}{\frac{2\pi n_{2ref}}{\lambda_{2ref}} - \frac{4\pi n_{ref}}{\lambda_{ref}}} = \frac{\lambda_{ref}}{2(n_{2ref}-n_{ref})},$$

where $\lambda_{ref}$ and $\lambda_{2ref}$ represent the wavelengths in vacuum corresponding to the reference frequency and its second harmonic, respectively.

Processes for fabricating PPLN optical elements are well known, and are described, in, for example, L. E. Myers, R. C. Eckardt, M. M. Fejer, R. L. Byer, W. R. Bosenberg, and J. W. Pierce, "Quasi-phase-matched optical parametric oscillators in bulk periodically poled LiNbO$_3$," *J. Opt. Soc. Am. B*, 12, 2102 (1995); A. Feisst and P. Koidi, "Current induced periodic ferroelectric domain structures in LiNbO$_3$ applied for efficient nonlinear optical frequency mixing," *Appl. Phys. Lett.*, 47, 1125 (1985); A. C. G. Nutt, V. Gopalan, and M. C. Gupta, "Domain inversion in LiNbO$_3$ using direct electron-beam writing," *Appl. Phys. Lett.*, 60, 2828 (1992); K. Nakamura, H. Ando, and H. Shimizu, "Ferroelectric domain inversion caused in LiNbO$_3$ plates by heat treatment," *Appl. Phys. Lett.*, 50, 1413 (1987); S. Makio, F. Nitanda, K. Ito, and M. Sato, "Fabrication of periodically inverted domain structures in LiTaO$_3$ and LiNbO$_3$ using proton exchange," *Appl. Phys. Lett.*, 61, 3077 (1992); K. Daneshvar and D. H. Kang, "A novel method for laser-induced periodic domain reversal in LiNbO$_3$," *IEEE J. Quant. Electron.*, 36, 85 (2000); M. Yamada, N. Nada, M. Saitoh, and K. Watanabe, "First-order quasi-phase matched LiNbO$_3$ waveguide periodically poled by applying an external field for efficient blue second harmonic generation," *Appl. Phys. Lett.*, 62, 435 (1993); and M. M. Fejer, G. A. Magel, D. H. Jundt, and R. L. Byer, "Quasi-phase-matched second harmonic generation: Tuning and tolerances," *IEEE J. Quant. Electron.*, 28, 2631 (1992).

In operation, a PPLN frequency mirror is illuminated by light of the reference frequency, or of twice the reference frequency. This operation is often referred to as "pumping," although it does not typically involve creating an inverted population of excited species in the PPLN. In FIG. 1, the pumping sources for the respective frequency mirrors are laser 30, denominated "Pump 1," and laser 40, denominated "Pump 2."

It should be noted that there are various nonlinear optical phenomena that may contribute to the operation of a frequency mirror. For example, PPLN exhibits second-order optical nonlinearity. As a consequence, PPLN devices can perform three-wave mixing, resulting in an output frequency that is the sum or difference of two input frequencies, one of which is a pump signal. Thus, one mode of operating a PPLN device in a frequency mirror is to pump it at twice the reference frequency, thereby to generate an output beam whose frequency is the difference between the pumping frequency and the input frequency. In an alternative mode, referred to as a "cascaded" configuration, three-wave mixing is exhibited in two respects: once by frequency doubling the pump light, which in this instance is input at the reference frequency; and a second time by generating output light at the difference frequency $2F-f_s$, as described earlier. Those skilled in the art will appreciate that similar operations may be performed by alternative materials that also exhibit second-order optical nonlinearity.

Other optical materials, which include certain semiconductors as well as optical fiber, exhibit third-order optical nonlinearity. One manifestation of such nonlinearity is four-wave mixing, in which, for example, two input frequencies are summed, and an output frequency is generated as the difference between the resulting sum and a third input frequency. Clearly, such a material can sum the pump frequency with itself, and generate the difference between that result and an input frequency. Thus, optical elements useful as frequency mirrors can also be made from third-order nonlinear optical materials.

In operation, the present invention requires the functionality of a frequency mirror. However, the invention is not limited to any particular implementation of a frequency mirror. All such implementations are regarded to be equivalent for the purpose of defining the scope of the invention. Specific embodiments will use PPLN devices, or other second-order or third-order nonlinear optical devices.

The operation of a pair of frequency mirrors to generate a frequency comb will now be described in further detail with reference to FIG. 2. In the discussion below, the spectral properties of light will most often be described in terms of wavelength, rather than frequency. It will be understood that wavelength and frequency stand in a mutually reciprocal relationship, and thus that a sequence of spectral lines that are evenly spaced in frequency will not, in general, be evenly spaced in wavelength.

On each pass through the pair 10, 20 of frequency mirrors of FIG. 1, a portion of the transmitted light undergoes a frequency shift, as discussed above. In FIG. 2, horizontal position relates to frequency or wavelength, with wavelength increasing to the right, and frequency to the left. Vertical position relates to the number of passes through the frequency mirrors, such that the shifted frequency resulting from each pass is represented at a lower position in the figure than that shifted frequency resulting from the preceding pass. The original frequency $f_s$ is indicated by point 50, and each succeeding, shifted frequency is represented by one of the points 61–66.

Vertical line 70 represents the position of the pump frequency for frequency mirror 10 of FIG. 1, and vertical line 71 represents the position of the pump frequency for frequency mirror 20 of FIG. 1.

Because the input beam passes first through frequency mirror 10, that element is denominated the "primary" frequency mirror, whereas frequency mirror 20 is denominated the "secondary" frequency mirror. For simplicity of presentation, only arrangements involving two frequency mirrors will be discussed here. It will be appreciated that devices employing the same inventive principles can be made with more than one secondary mirror. Such devices are also considered to lie within the scope and spirit of the present invention.

Figure 2:
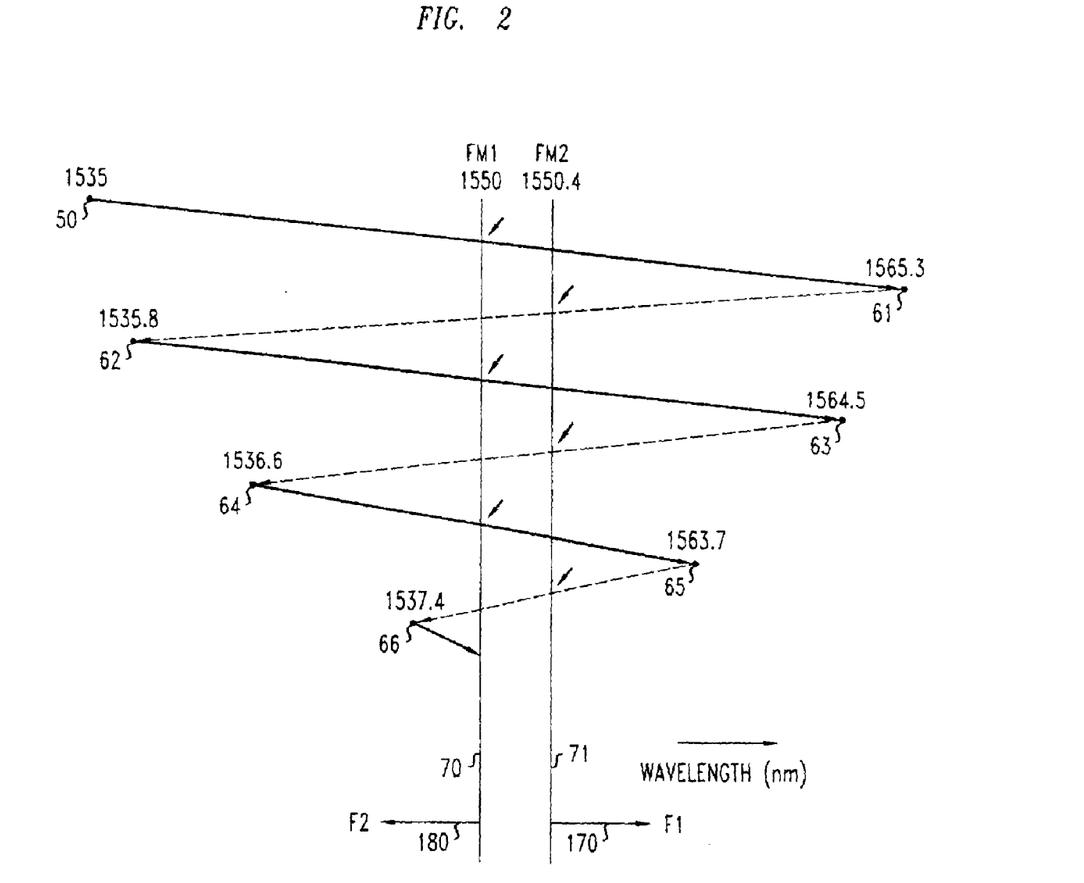
FIG. 2 is a graphical representation of the use of two frequency mirrors to generate a converging set of shifted frequencies that compose a frequency comb. Wavelength increases from left to right in the figure, and therefore frequency increases from right to left.

As indicated in FIG. 2, one exemplary pair of pump wavelengths are 1550 nm and 1550.4 nm. These wavelengths are separated in frequency by nearly 50 GHz, and thus will lead to frequency combs with a spacing of about 100 GHz. One input wavelength 50 that is useful in connection with the exemplary pump wavelengths is 1535 nm, as indicated in the figure. On the first pass, input wavelength 50 is reflected in FM1 to produce wavelength 61, exemplarily at 1565.3 nm.

It should be noted that although the various points 50, 61–66 in FIG. 2 have been labeled with wavelengths, the positions occupied by the points are relative positions in frequency, and not in wavelength. It should be emphasized that FIG. 2 is provided purely for pedagogical purposes, and is not drawn to scale.

It will be understood that all specific wavelengths referred to below are purely illustrative, and not limiting as to the scope of the invention.

It should be noted that a residual portion of the input beam will pass through FM1 without frequency conversion, and thus, unless first removed from the optical system, will be directly reflected in FM2 to produce a new frequency that would lie to the right of point 61 in the figure. However, at least some embodiments of the invention will include optical filters that, inter alia, remove residual power at the wavelength corresponding to point 50 prior to reflection in FM2. It will be assumed in the following discussion that such optical filtration has been included.

As noted, point 50 (1535 nm) is reflected in FM1 to generate point 61 (1565.3 nm). Point 61 is reflected in FM2 to generate point 62 (1535.8) nm. The reflections continue, alternating between FM1 and FM2, until a limiting point is reached. As will be explained below, the limiting point is advantageously defined by optical filtration.

As viewed in FIG. 2, the reflections in FM1 lead to a decreasing sequence of points to the right, i.e., to the high-wavelength side, of the pair of pump lines 70, 71, and the reflections in FM2 lead to an increasing sequence of points to the left, i.e., to the low-wavelength side, of the pump pair. It is advantageous to select optical filters that cut off these sequences before they reach the region between the pump wavelengths. Significantly, the left-hand sequence of points, which comprises wavelengths 1535 nm, 1535.8 nm, 1536.6 nm, 1537.4 nm, etc., has a frequency spacing between successive points of 100 GHz, and likewise the right-hand sequence, which comprises wavelengths 1565.3 nm, 1564.5 nm, 1563.7 nm, etc.

Figure 3:
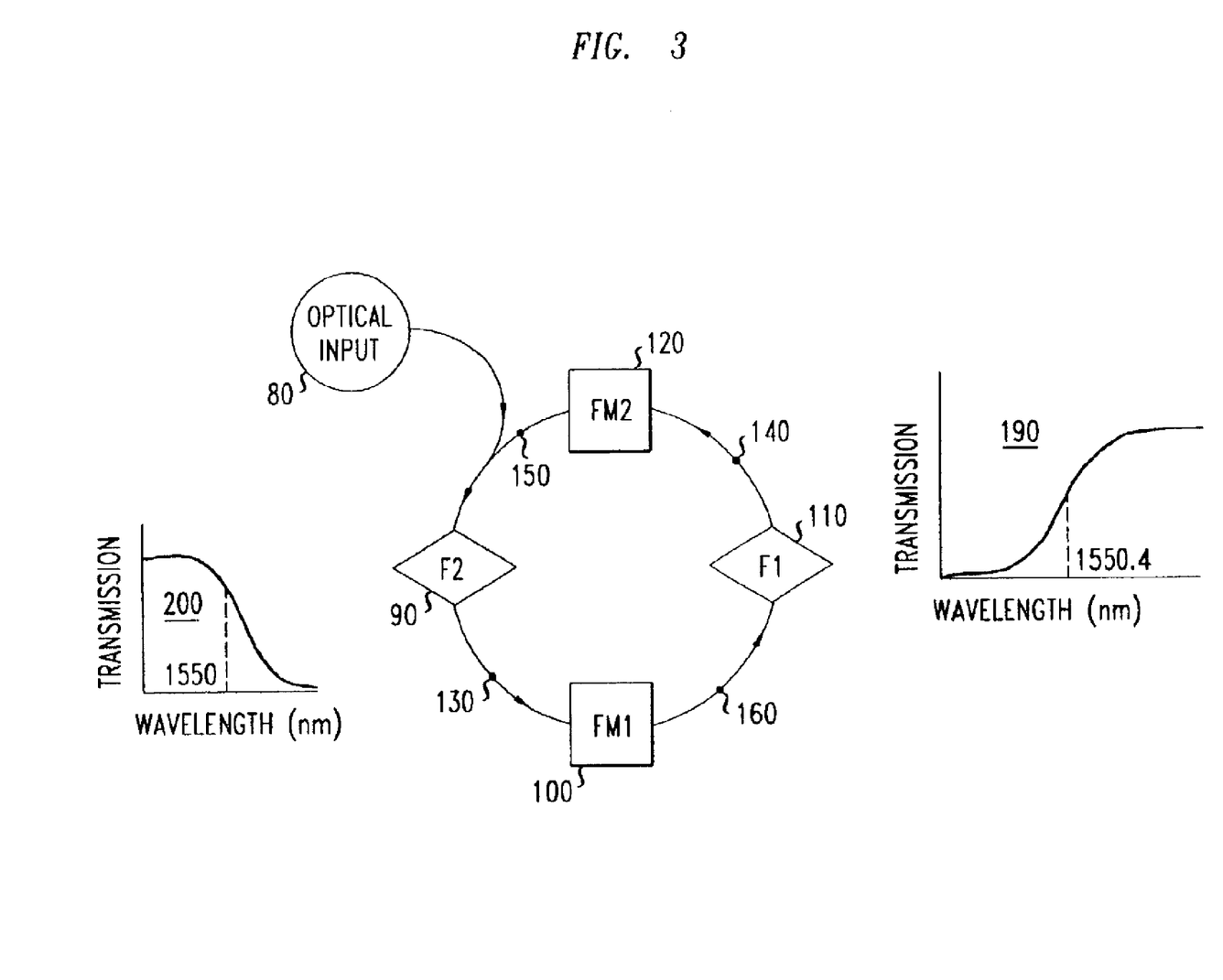
FIG. 3 is a simplified schematic diagram of a system of frequency mirrors and optical filters able to generate frequency combs such as those illustrated in FIG. 2.

FIG. 3 schematically represents a system of frequency mirrors and optical filters able to generate frequency combs such as those illustrated in FIG. 2. The operation of the system of FIG. 3 will be illustrated with reference to the set of wavelengths of FIG. 2. Thus, input light from source 80 enters the system with wavelength 1535 nm and begins to circulate in the system. For purposes of the present illustration, source 80 is assumed to be a continuous source. The circulating light is transmitted by filter 90, denominated "F2" in the figure. Filter 90 is advantageously made a low-pass filter (in wavelength), with a cutoff at the primary pump wavelength, which in the present illustrative embodiment is 1550 nm. Primary frequency mirror 100, denominated "FM1" in the figure, transmits some of the circulating light without frequency conversion, and converts some to a wavelength of 1565.3 nm.

The circulating light then enters filter 110, denominated "F1" in the figure. Filter 110 is advantageously made a high-pass filter (in wavelength), with a cutoff at the secondary pump wavelength, which in the present illustrative embodiment is 1550.4 nm. Filter 110 transmits the 1565.3 nm light, but stops the unconverted 1535-nm light. Importantly, the light at the original source wavelength of 1535 nm is stopped in filter 110 before entering the secondary frequency mirror. Thus, filter 110 prevents this unconverted light from seeding any frequency comb beginning with a reflection in the secondary frequency mirror.

The 1565.3-nm light passed by F1 (i.e., filter 110) then enters secondary frequency mirror 120, denominated "FM2" in the figure. The light exiting FM2 has wavelengths 1565.3 nm and 1535.8 nm. Circulating light of both these wavelengths re-enters F2, together with newly inserted light at 1535 nm. F2 stops the 1565.3-nm light, but passes the circulating light at 1535 nm and 1535.8 nm.

It will be evident that on each circuit of the system of FIG. 3, a further wavelength in the left-hand sequence and a further wavelength in the right-hand sequence of FIG. 2 is generated. Because of the action of the filters F1 and F2, only the left-hand sequence is available for extraction by an output port situated at location 130, and only the right-hand sequence is available at location 140. At location 150, both sequences are available, except that the original wavelength of 1535 nm is unavailable because it has been cut off by F1. At location 160, both sequences, including 1535 nm, are available.

It should be noted that light circulating in the system of FIG. 3 will generate useful output even without undergoing a full number of complete passes through the system. For example, turning to FIG. 2, output light at frequency 63 will be generated by two passes through FM1 and only one pass through FM2. Such light is obtained from the system of FIG. 3 by tapping at, e.g., output point 140 or output point 160. In general, light that has undergone multiple passes through the system of FIG. 3 will lead to useful output regardless of whether the passages through FM1 and FM2 are equal or unequal in number.

Comparing FIG. 2 with FIG. 3, it is evident that filter F2 prevents any light represented by a point of the right-hand sequence from entering the primary frequency mirror FM1. It is similarly evident that filter F1 prevents any light of the left-hand sequence from entering FM2.

Upon further comparison of FIGS. 2 and 3, it is evident that if the reflection of, e.g., point 66 in FM1 were to generate a point lying between the pump lines 70, 71, such a reflected point would be cut off (as too low in wavelength) by high-pass filter F1. Similarly, if the reflection of, e.g., point 65 in FM2 were to generate a point lying between the pump lines, such a reflected point would be cut off (as too high in wavelength) by low-pass filter F2. The wavelengths passed by filters F1 and F2 are indicated in FIG. 2 by arrows 170 and 180, respectively. Exemplary transmission characteristics for F1 and F2 are illustrated in FIG. 3 by insets 190 and 200, respectively.

Those skilled in the art will appreciate that high-pass, low-pass, and band-pass optical filters with cutoff frequencies other than those illustrated here may also be used to restrict the comb frequencies to desired ranges and to reduce optical noise.

Filters 90 and 110 of FIG. 3 will typically have certain cutoff frequencies, such that the filter which is high-pass in frequency (and thus low-pass in wavelength) will attenuate light at frequencies below its respective cutoff, and the filter which is low-pass in frequency (and thus high-pass in wavelength) will attenuate light at frequencies above its respective cutoff. It will generally be advantageous to set the cutoff frequency of the high-pass filter at or near the lower of the pump frequencies, or somewhat higher. In at least some cases, in fact, it will be advantageous to set this cutoff frequency at or near the higher of the pump frequencies, so that frequencies lying between the pump frequencies are attenuated.

Similarly, it will generally be advantageous to set the cutoff frequency of the low-pass filter at or near the higher of the pump frequencies, or somewhat lower. In at least some cases, in fact, it will be advantageous to set this cutoff frequency at or near the lower of the pump frequencies, so that, again, frequencies lying between the pump frequencies are attenuated.

It will be evident from reference to FIG. 2 that frequencies falling between pump lines 70 and 71 are, without suppressive measures, capable of seeding further, diverging frequency combs. To suppress this behavior, it is advantageous for one or both of filters 90 and 110 of FIG. 3 to attenuate light whose frequency lies between the two pump frequencies.

It should be noted in this regard that when an optical amplifier is used whose optical bandwidth is wider than the desired bandwidth of the frequency comb, it will generally be advantageous to employ at least one band-pass filter to reduce the bandwidth of optical noise.

Although FIG. 2 illustrates the case in which a low input wavelength generates a comb that extends toward the pump lines 70, 71, it will be appreciated that frequency combs extending from the input signal to wavelengths more distant from pump lines 70, 71 are also readily obtained by suitable selection of pump frequencies for the frequency mirrors, e.g., for frequency mirrors 10 and 20 of FIG. 1. It will also be appreciated that an input signal wavelength lying to the right of pump lines 70, 71 may be used instead of an input signal lying to the left of the pump lines as shown in FIG. 2.

To generate a comb of frequencies that diverge away from the pump lines instead of converging toward them, the practitioner might, for example, use frequency 65 of FIG. 2 as the input frequency. In that case, provided that filters F1 and F2 are placed appropriately, a diverging comb of frequencies will be generated by a process represented by a modified version of FIG. 2 with reversal of all of the arrows representing frequency reflections. The proper placement of filters F1 and F2 in, for example, the arrangement of FIG. 3 would be that shown in the figure, but with filter F1 occupying the place of filter 90 and filter F2 occupying the place of filter 110. That is, to generate a diverging rather than a converging comb, the filters would be interchanged, and the input signal would have a wavelength passed by the filter occupying the filter position denoted by reference numeral 90 in FIG. 3. An appropriate such input wavelength would be greater than both of the pump wavelengths.

Figure 4:
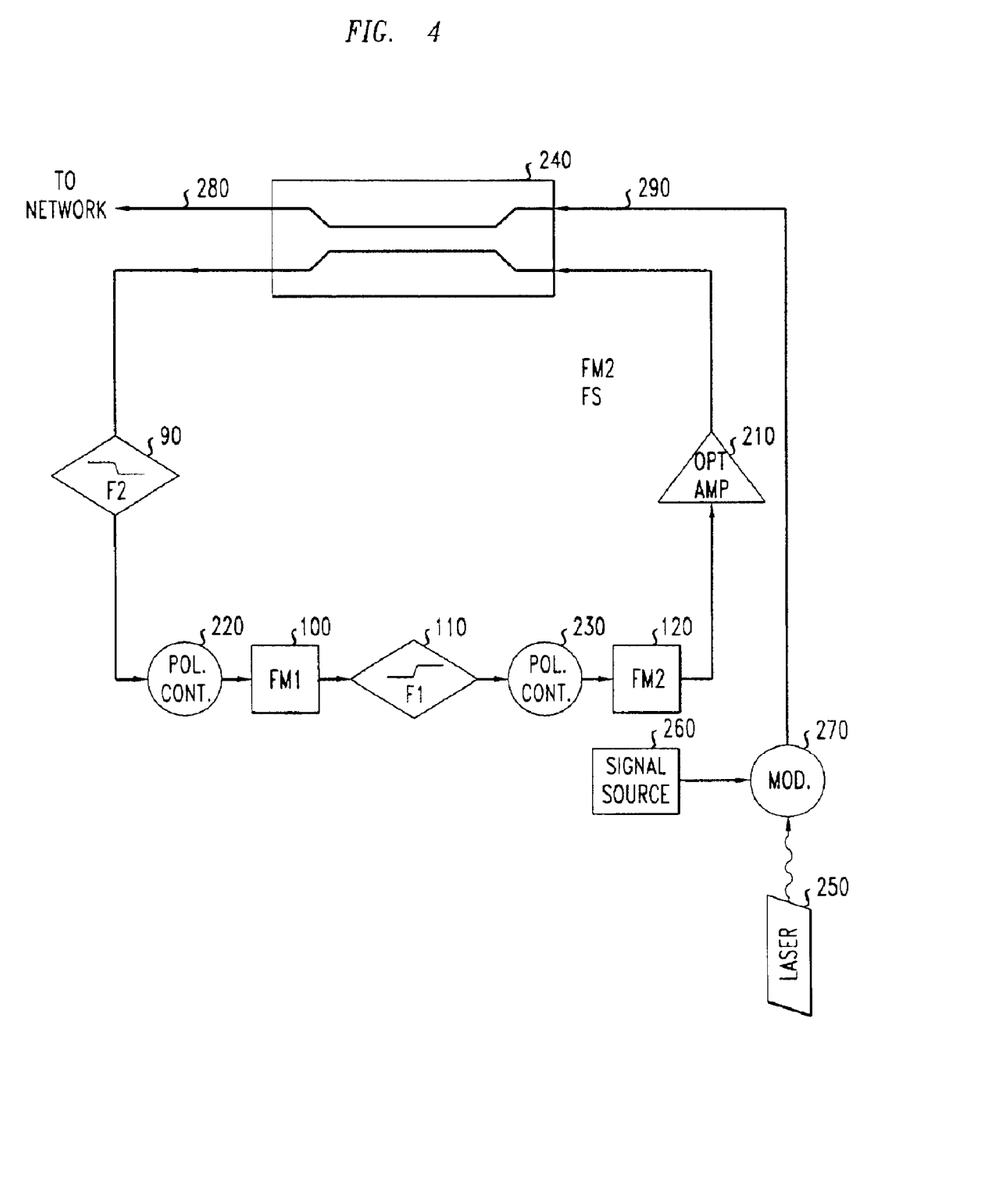
FIG. 4 is a schematic diagram of a comb-generating system such as that of FIG. 2, showing further details. The system of FIG. 4 includes a source of modulated input light and a coupling element for optical input and output.

In practice, a system of the kind illustrated in FIG. 3 will include elements further to those shown in that figure. In FIG. 4, for example, where like reference numerals denote elements common to FIG. 3, there are also represented optical amplifier 210, polarization controllers 220 and 230, optical coupler 240, laser 250, signal source 260, and modulator 270. The elements shown will typically be interconnected by optical fiber or another optical waveguiding medium.

Optical amplifier 210 is provided to compensate for optical losses in the system. One suitable optical amplification technology for this purpose is that of erbium-doped fiber amplifiers (EDFAs). EDFAs and related amplifiers are well known, and need not be described here in detail.

Certain of the types of optical elements suitable for use as frequency mirrors behave in a manner that is sensitive to optical polarization. PPLN devices, for example, typically exhibit relatively high sensitivity to polarization. The same is true of some devices based on highly nonlinear optical fiber. Polarization controllers 220 and 230 are included as optional elements in FIG. 4 for use in conjunction with polarization-sensitive frequency mirrors.

In the configuration shown in FIG. 4, optical coupler 240 is used both to inject light into the system from the optical source, and to couple light out of the system, via exit port 280, for utilization in, e.g., an optical communication network. Typically, optical coupler 240 will be a 3-dB coupler, which extracts approximately half the optical power circulating in the system. Those skilled in the art will appreciate that other types of optical coupler will also be useful in this context. In fact, coupling of less than half the optical power in the generated wavelength comb to exit port 280 may result in a better signal-to-noise ratio in the output comb.

From a comparison between FIGS. 3 and 4, it will be appreciated that coupler 240 occupies the location in the optical system designated by the reference numeral 150 in FIG. 3. As noted, both of the generated wavelength combs are available at this position, except for the original wavelength provided by laser 250. However, in the arrangement of FIG. 4, the original wavelength provided by laser 250 will in fact appear at exit port 280 by virtue of direct coupling from input port 290.

As illustrated in FIG. 4, the optical source comprises a laser 250 or other optically emissive device configured to produce light at the original signal wavelength, such as the wavelength 1535 nm in the example of FIGS. 2 and 3. The optical source also comprises a modulator 270 for impressing a stream of data on the output from laser 250, and a signal source 260 for driving modulator 270.

It should be noted that operation in the configuration shown in FIG. 4 will typically result in the same stream of data being impressed on each of the comb wavelengths. In alternative arrangements, one or more frequency-selective devices, such as wavelength demultiplexers, are used to separate at least some of the comb wavelengths prior to modulation, so as to impress different data streams on different wavelengths or groups of wavelengths. In such alternative arrangements, modulator 270, and possibly further modulators, would be situated downstream of output port 280.

It will be appreciated that the arrangement shown in FIG. 4, where modulator 270 precedes the comb generator, is effective for imposing the same pattern of modulation on each of the comb wavelengths that are produced. Such an arrangement is useful, among other things, for broadcasting the identical data stream to many receivers in a multiple-wavelength optical communication system.

Figure 5:
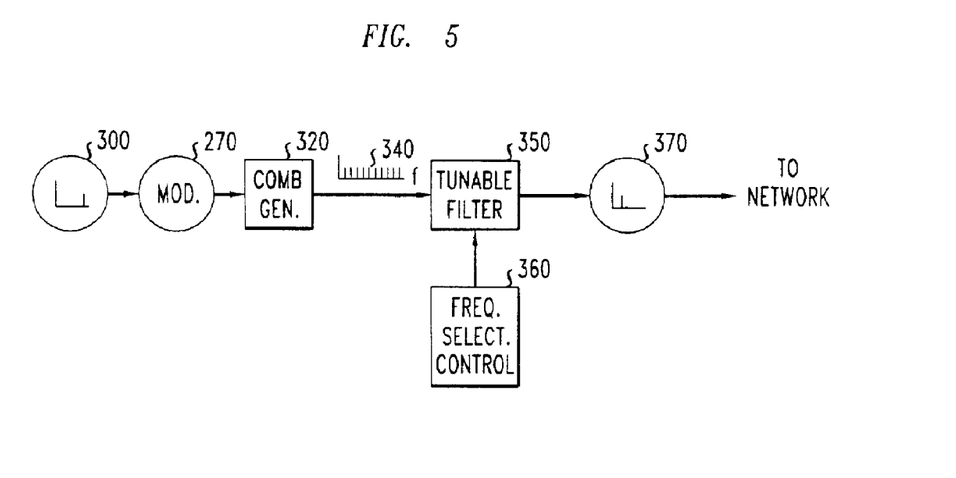
FIG. 5 is a simplified schematic diagram of an optical system that includes a comb generator of the kind illustrated in FIG. 4. The system of FIG. 5 has applications, among others, to the switching of a modulated optical signal from one wavelength channel to another in an optical communication network.

FIG. 5 depicts a further practical application for an arrangement such as that of FIG. 4. In FIG. 5 the unmodulated input signal is represented schematically as single-component frequency spectrum 300, and components 90, 100, 110, 120, 210, 220, 230, and 240 of FIG. 4 are summarized as comb generator 320. In FIG. 5, as in FIG. 4, a signal (indicated in FIG. 5 as signal 300) passes through modulator 270 before entering the comb generator.

Still referring to FIG. 5, the frequency comb 340 output by the comb generator is subjected to further processing that results in selection of only a single frequency 370 from the frequency comb for injection into an optical network. In FIG. 5, the frequency-selective processing is represented by tunable filter 350, operating responsively to frequency-selection control 360. By way of example, control 360 may operate by applying a tuning voltage to a lithium niobate phase-shifting element. It is well known that when such elements are included in the optical path within an appropriate interferometer, such as a planar waveguide Mach-Zehnder interferometer, the interferometer can be made to exhibit tunable, frequency-selective behavior. One example of such a frequency-selective device is described in E. L. Wooten et al., "Rapidly Tunable Narrow Band Wavelength Filter Using Linbo3 Unbalanced Mach Zehnder Interferometers", *Journal of Lightwave Technology* 14, 2530–2536 (1996).

The arrangement of FIG. 5 is useful, among other things, as a wavelength shifter for the purpose of switching the input optical signal from the input channel 300 to a selectable output channel 370. Such an operation is advantageously practiced, for example, at the nodes of multiple-wavelength optical networks.

Figure 6:
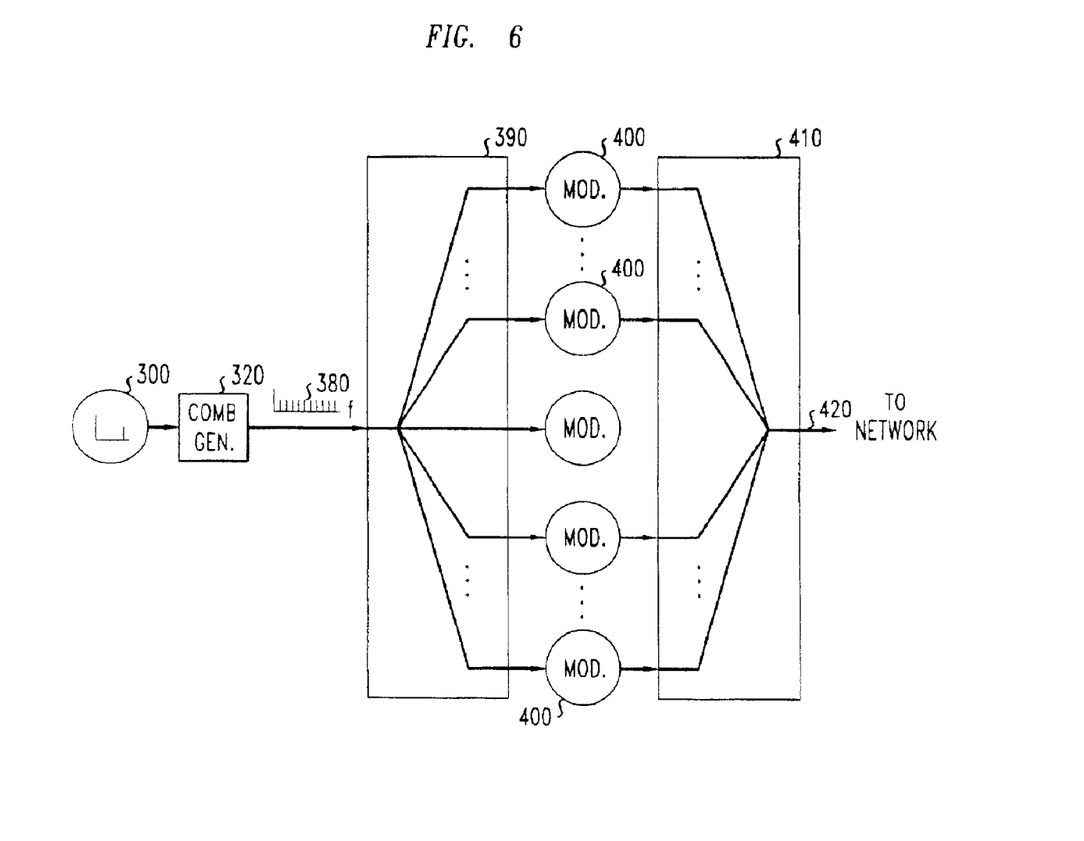
FIG. 6 is also a simplified schematic diagram of an optical system that includes a comb generator of the kind illustrated in FIG. 4. The system of FIG. 6 has applications, among others, as a source of multiple wavelength channels, each of which can be independently modulated, in an optical communication network.

Another advantageous application of comb generator 320 is illustrated in FIG. 6. In the arrangement of FIG. 6, input signal 300 is unmodulated when it enters comb generator 320, and modulation takes place after frequency comb 380 has been generated. As shown in FIG. 6, at least some of the individual frequency components of comb 380 are separated and directed individually to respective output ports by element 390, which is exemplarily a wavelength demultiplexer (DMUX). Thus, each of the separated frequency components constitutes a respective wavelength channel.

Exemplary DMUX elements are described in Y. P. Li and C. H. Henry, "Silicon Optical Bench Waveguide Technology", in *Optical Fiber Telecommunications IIIB*, edited by I. P. Kaminow and T. L. Koch, pages 351–358 (1997); and C. Dragone, et al., "Efficient multichannel integrated optics star coupler on silicon", *IEEE Photon. Technol. Lett* 1, 241–243 (1989).

Still referring to FIG. 6, each of the modulators 400 imposes a data stream on its corresponding wavelength channel. Each of the imposed data streams can be distinct from the others. All of the modulated wavelength channels are then recombined by element 410, exemplarily a wavelength multiplexer (MUX), onto waveguide 420, which is typically an optical fiber, and injected from there into an optical communication network.

The embodiments of the invention described above are merely exemplary, and have numerous variations and alternatives that can be practiced without departing from the scope and spirit of the present invention. For example, the frequency mirrors may take the form of PPLN devices whose laminar structure has a chirped, i.e., a spatially variable, repetition pattern. Chirping relaxes the requirement for a precisely matched pump frequency, and instead permits the pump laser to be tuned over a range of frequencies, all of which are effective. Because the spacing of the frequency comb depends on the difference between the pump frequencies, tunable pumping is useful, among other things, for generating an adjustable comb.

In another alternative, at least one of the frequency mirrors is embodied in a gain medium, so that optical amplification and comb generation take place coextensively. In such an arrangement, it may be possible to omit a separate optical amplifier element.

In another alternative, frequency mirrors 100 and 120 of FIG. 4 are not arranged in a loop. Instead, the frequency mirrors, together with other necessary components, are enclosed between a pair of mirrors or other reflective elements. In such an arrangement, multiple passes through the frequency mirrors are the result of multiple reflections between the reflective elements.

Yet another alternative is a linear array of two or more stages. Each stage is individually an arrangement such as that of FIG. 4, but operated in a single-pass configuration without looping. In one exemplary mode of operation, one frequency component of the comb is extracted from each stage of the array.

What is claimed is:

1. A method for shifting the optical frequency of light from an input frequency to at least two shifted frequencies, comprising:

in a first nonlinear optical device having a reference frequency $F_1$, shifting at least some of the power of a light beam from the input frequency to a first shifted frequency situated in the electromagnetic spectrum such that $F_1$ lies midway between the input frequency and the first shifted frequency; and in a second nonlinear optical device having a reference frequency $F_2$, shifting at least some of said power from the first shifted frequency to a second shifted frequency situated in the electromagnetic spectrum such that $F_2$ lies midway between the first and second shifted frequencies and a difference of $2(F_2-F_1)$ separates the second shifted frequency from the input frequency.

2. The method of claim 1, further comprising optically filtering the light output from the first said device prior to entry of the light into the second said device, thereby to reduce the amount of input-frequency light that enters the second said device.

3. The method of claim 1, further comprising returning at least some of the light output from the second said device and passing it at least one more time through at least the first said device.

4. The method of claim 1, further comprising cycling light in multiple passes through said first and second devices.

5. The method of claim 4, further comprising amplifying the light between each successive pair of said multiple passes.

6. The method of claim 4, further comprising extracting a portion of the light from each of said multiple passes, thereby to obtain a frequency comb of output light.

7. The method of claim 4, further comprising at least two steps of optical filtering on each said pass, wherein:

one filtering step, to be referred to as frequency high-pass filtering, reduces the amount of light having frequencies less than at least the smaller of $F_1$ and $F_2$; and another filtering step, to be referred to as frequency low-pass filtering, reduces the amount of light having frequencies greater than at most the larger of $F_1$ and $F_2$.

8. The method of claim 7, wherein the frequency high-pass filtering is carried out so as to reduce the amount of light having frequencies less than the larger of $F_1$ and $F_2$.

9. The method of claim 7, wherein the frequency low-pass filtering is carried out so as to reduce the amount of light having frequencies greater than the smaller of $F_1$ and $F_2$.

10. The method of claim 7, wherein:
the high-pass filtering is carried out so as to directly affect light entering the device having the higher reference frequency; and
the low-pass filtering is carried out so as to directly affect light entering the device having the lower reference frequency.

11. The method of claim 7, wherein:
the high-pass filtering is carried out so as to directly affect light entering the device having the lower reference frequency; and
the low-pass filtering is carried out so as to directly affect light entering the device having the higher reference frequency.

12. Apparatus, comprising:
at least first and second nonlinear optical devices, each having an input, an output, and a reference frequency; and
an exit optical medium for extraction therethrough of at least some light after passing at least once through each of the first and second said devices, wherein:
each of said first and second devices is effective for shifting at least some of the power of a light beam from an initial frequency applied to its input to a shifted frequency situated in the electromagnetic spectrum such that the pertinent reference frequency lies midway between the initial frequency and the shifted frequency;
the first device has reference frequency $F_1$ and the second device has reference frequency $F_2$ which is different from $F_1$; and
the input to the second said device is optically coupled to the output of the first said device, such that in combination, the first and second devices are effective for shifting at least some of the power in an input beam applied to the input of the first device from an input frequency to a twice-shifted output frequency separated from the input frequency by $2(F_2-F_1)$.

13. The apparatus of claim 12, further comprising an optical filter arranged to reduce the power, at the input frequency, of light exiting the first device prior to entry of said light into the second device.

14. The apparatus of claim 12, further comprising an optical path that couples the output of the second device to the input of the first device, such that light can be cycled in multiple passes through said first and second devices.

15. The apparatus of claim 14, further comprising an optical amplifier in the optical path.

16. The apparatus of claim 14, further comprising an optical coupling element in the optical path, said coupling element arranged to extract a portion of the light cycling in the optical path from the optical path into the exit optical medium.

17. The apparatus of claim 14, further comprising:
an optical filter situated so as to directly affect light entering the device having the higher reference frequency, and
a further optical filter situated so as to directly affect light entering the device having the lower reference frequency,
wherein one of said filters is effective for reducing the amount of light having frequencies greater than at most the larger of $F_1$ and $F_2$, and the other of said filters is effective for reducing the amount of light having frequencies less than at least the smaller of $F_1$ and $F_2$.

18. The apparatus of claim 14, further comprising:
an optical filter situated so as to directly affect light entering the device having the higher reference frequency, said filter effective for reducing the amount of light having frequencies less than the larger of $F_1$ and $F_2$; and
an optical filter situated so as to directly affect light entering the device having the lower reference frequency, said filter effective for reducing the amount of light having frequencies greater than the smaller of $F_1$ and $F_2$.

19. The apparatus of claim 14, further comprising:
an optical filter situated so as to directly affect light entering the device having the lower reference frequency, said filter effective for reducing the amount of light having frequencies less than the larger of $F_1$ and $F_2$; and
an optical filter situated so as to directly affect light entering the device having the higher reference frequency, said filter effective for reducing the amount of light having frequencies greater than the smaller of $F_1$ and $F_2$.

20. The apparatus of claim 14, further comprising a tunable filter optically coupled to the exit optical medium and effective, in response to a control signal, for selecting between individual optical frequencies of light extracted from the optical path.

21. The apparatus of claim 14, further comprising:
a frequency demultiplexer having an input optically coupled to the exit optical medium and having multiple outputs, each corresponding to a distinct frequency channel;
a frequency multiplexer having multiple inputs, each corresponding to a distinct frequency channel, and having an output;
two or more modulators, each optically coupled between an output of the demultiplexer and an input of the multiplexer; and
an output waveguide optically coupled to the output of the multiplexer.

22. The apparatus of claim 12, wherein each of the first and second nonlinear optical devices comprises a PPLN device.

23. The apparatus of claim 22, wherein each of the first and second nonlinear optical devices further comprises a pump laser having an output optically coupled to the pertinent PPLN device.

* * * * *